April 18, 1967  H. W. GUEGOLD  3,314,688
MOBILE VEHICLE FOR FOOD STORAGE
Filed Nov. 26, 1965

INVENTOR.
HOWARD W. GUEGOLD

United States Patent Office 3,314,688
Patented Apr. 18, 1967

3,314,688
MOBILE VEHICLE FOR FOOD STORAGE
Howard W. Guegold, R.D. 4, Chew Road,
Mansfield, Ohio 44903
Filed Nov. 26, 1965, Ser. No. 510,006
3 Claims. (Cl. 280—47.37)

My invention is directed toward a mobile vehicle which is adapted for removable storage of food and which can be easily moved from place to place and used for family picnics and the like. I call my vehicle a Pic-Mobile.

Accordingly it is an object of my invention to provide a new and improved mobile vehicle adapted for removable storage of food which can carry enough food for a family picnic, which can be carried in an automobile to a suitable parking location for the automobile, and thereafter can be easily pushed or rolled into a suitable place for holding the picnic.

Another object is to provide a new and improved mobile vehicle of the character indicated having a novel braking action.

Still another object is to provide a new and improved mobile vehicle of the character indicated which is rugged and durable and which can be manufactured easily and inexpensively.

Figure 1:
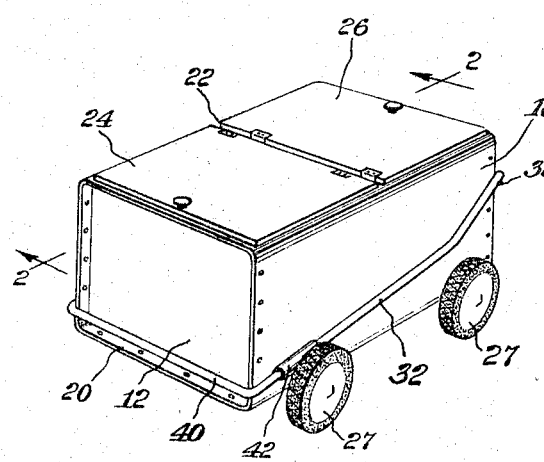
Figure 2:
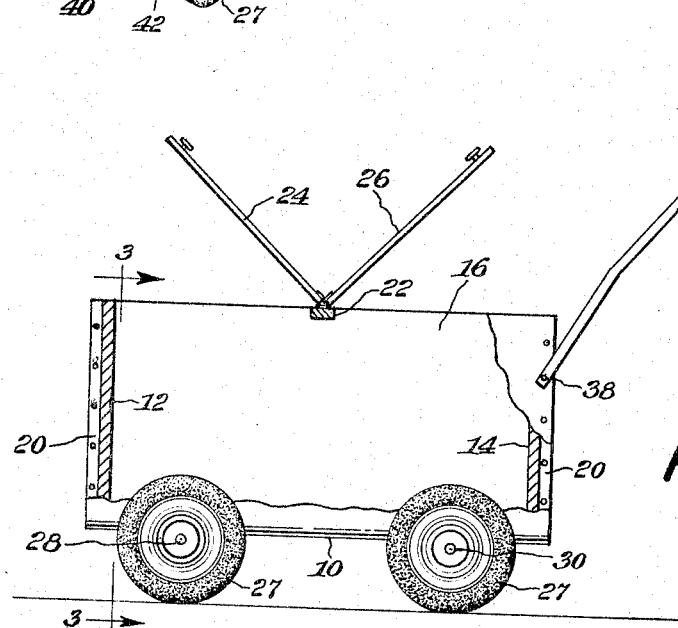

All of the foregoing and still further objects and advantages of my invention will now be explained with reference both to this specification and to the accompanying drawings wherein:

FIG. 1 is a perspective view of my vehicle;
FIG. 2 is a cross sectional view thereof taken along 2—2 in FIG. 1; and
FIG. 3 is a cross sectional view taken along 3—3 in FIG. 2.

Figure 3:
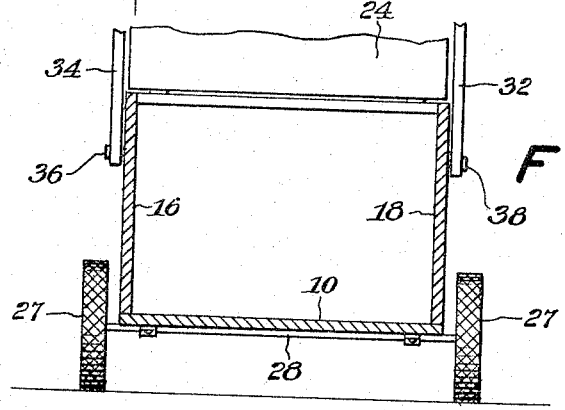

Referring now to FIGS. 1-3, there is shown a hollow rectangular box having a horizontal bottom rectangular sheet 10, oppositely disposed parallel vertical end walls 12 and 14 and oppositely disposed vertical side walls 16 and 18. Each end wall is secured to the adjoining edges of the two side walls and bottom sheet by metal riveted straps 20.

The top horizontal edges of both side walls are connected together at their midpoints by a transversely extending horizontal wood member 22. First and second top lids 24 and 26 are each hingedly secured to member 22. Lid 24, when closed, seals that portion of the top opening of the box bounded by end wall 12, appropriate portions of the side walls and member 24. Lid 26, when closed, seals that portion of the top opening of the box bounded by end wall 14, appropriate portions of the side walls and member 24.

First and second wheels 27 are secured rotatably between opposite ends of a front axle 28 extending horizontally adjacent wall 12 between the side walls and secured to the bottom surface of sheet 10. Third and fourth wheels 27 are secured rotatably between opposite ends of a rear axle 30 extending horizontally adjacent wall 14 between the side walls and secured to the bottom surface of sheet 10.

First and second hollow tubular members 32 and 34 are pivotally secured at 36 and 38 respectively to opposite side walls adjacent end wall 14. The other ends of members 32 and 34 are connected by a transverse tubular member 40. Concentrically disposed about each member 32 and 34 adjacent member 40 are rubber hollow cylindrical grips 42.

In use, the lids are opened, food is placed in the box and the lids are closed. With members 32 and 34 moved horizontally in such manner that grips 42 are wedged between front wheels 27 and the corresponding side walls, the wheels are locked, the unit is "braked" and cannot move as shown in FIG. 1. When members 32 and 34 are moved into an inclined position rearward of the unit, the wheels are free to turn and the vehicle can be pushed, as for example over rough or smooth terrain, by a user pushing on member 40 as shown in FIG. 2.

While my invention has been described with detailed reference to the drawings, my protection is to be limited only by the terms of the claims which follow.

Having thus described my invention, I claim as new and desire to secure by Letters Patent:

1. A mobile vehicle for food storage comprising a hollow rectangular box having an open horizontal top, oppositely disposed vertical side and end walls, said side and end walls being interconnected and a horizontal rectangular bottom sheet secured to the bottom horizontal edges of said walls, lid means removably sealing the open top of said box, wheel means secured to the bottom of said sheet, and handle means pivotally mounted on said box, said handle means having a first position at which said box can be pushed on said wheels and having a second position at which said wheel means are locked and cannot turn, said wheel means including a first pair of front wheels interconnected by a horizontal axle secured to said sheet adjacent one of said end walls and a second pair of rear wheels interconnected by another horizontal axle secured to said sheet adjacent the other of said end walls, and wherein said handle means including first and second rubber grips, each grip, when said handle means is in the second position, being wedged between a corresponding side wall and a corresponding front wheel.

2. A vehicle as set forth in claim 1 further including a strap securing each end wall to adjacent end portions of both side walls and said sheet.

3. A vehicle as set forth in claim 2 further including a horizontal member extending transversely between the midpoints of the top horizontal edges of both side walls, said lid means including first and second covers hingedly secured to said horizontal member.

References Cited by the Examiner

UNITED STATES PATENTS

| 1,082,323 | 12/1913 | Harris | 280—47.37 |
| 2,727,753 | 12/1955 | Johnson et al. | 280—47.37 |
| 2,948,798 | 8/1960 | Ness | 280—79.2 X |
| 3,270,902 | 9/1966 | Breault | 220—29 X |

MILTON BUCHLER, Primary Examiner.
C. C. PARSONS, Assistant Examiner.